United States Patent [19]

Fukami et al.

[11] Patent Number: 5,234,975
[45] Date of Patent: Aug. 10, 1993

[54] COMPOSITION SUPERIOR IN QUICK-CURING FOR FIBER-REINFORCED POLYURETHANE RESIN

[75] Inventors: Takao Fukami, Fujisawa; Yoshizumi Kataoka, Tokyo, both of Japan

[73] Assignee: Nippon Polyurethane Industry Co., Ltd., Japan

[21] Appl. No.: 830,558

[22] Filed: Feb. 3, 1992

Related U.S. Application Data

[63] Continuation of Ser. No. 7,472,645, Jan. 30, 1990, abandoned.

[30] Foreign Application Priority Data

Jan. 31, 1989 [JP] Japan ................... 1-19765

[51] Int. Cl.$^5$ ............................................. C08K 7/02
[52] U.S. Cl. ...................... 523/222; 521/129; 264/331.19; 528/53
[58] Field of Search ............... 523/222; 528/53, 129; 521/129; 264/33.19

[56] References Cited

U.S. PATENT DOCUMENTS 3,669,920  6/1972  Haggis et al. ................. 523/222
4,098,730  7/1978  Hilterhaus et al. ............. 528/53
4,546,122 10/1985  Radovich et al. .............. 521/114
4,616,043 10/1986  Smith ......................... 523/222
4,774,268  9/1988  Marx et al. ................... 523/179

*Primary Examiner*—Melvyn I. Marquis
*Attorney, Agent, or Firm*—Davis Hoxie Faithfull & Hapgood

[57] ABSTRACT

A composition for fiber-reinforced polyurethane resin, which comprises a long-fiber mat and a polyurethane composition, said polyurethane composition comprising:

(a) an organic polyisocyanate,
(b) a polyether polyol having a molecular weight of from 300 to 700, and having three or more functional groups,
(c) ethylene glycol and/or 1,3 butanediol,
(d) an imidazole represented by the general formula (1), as a curing catalyst,

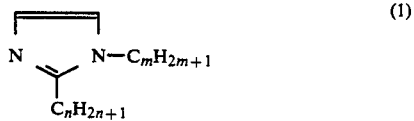

(1)

where m is an integer of from 1 to 4, and n is an integer of from 1 to 4.

24 Claims, No Drawings

COMPOSITION SUPERIOR IN QUICK-CURING FOR FIBER-REINFORCED POLYURETHANE RESIN

This is a continuation of copending application Ser. No. 07/472,645, filed on Jan. 30, 1990, now abandoned.

BACKGROUND OF THE INVENTION

1. Field of the Invention

The present invention relates to a composition for fiber reinforced polyurethane resin (hereinafter, referred to as "a fiber-reinforced polyurethane composition", which has a quick-curing property of giving a cured product at a temperature in the range of from 40° to 60° C. for 1 to 3 minutes, and the cured product being superior in impact resistance, heat-resistance, and rigidity.

2. Related Background Art

Consumption of plastics is increasing recently in automotive-parts industry associated with the trend toward the light-weight and the diversification of design of cars. In particular, long-fiber-reinforced plastics having a higher rigidity are increasingly used for structural members and semi-structural members.

Heretofore, unsaturated polyester resins have mainly been used for such purposes. These types of resins are known to be molded effectively by use of sheet molding compounds SMC). These resins, however, require a high temperature and a high pressure in processing, thus requiring a large investment for processing machines. A resin injection process is known in which a liquid unsaturated polyester resin composition is injected into a mold containing a fibrous reinforcing material preliminarily, and after closing the mold, the resin is cured in the mold. In this process, however, the resin comes to be cured slowly, resulting in low productivity. Moreover, such types of resins exhibit generally low impact strengths.

On the other hand, polyurethane resins, which are known to give impact-resistant cured products, do not generally have satisfactory heat-resistance. In a method for improving the heat-resistance, a multi-functional polyol is employed to raise crosslinking density in the resin. Although this method accelerates the gellation, it involves problems such that the reaction ratio is low at the time immediately after curing, the unreacted isocyanate groups and hydroxyl groups are liable to remain, thus, the development of the properties is slow, and the properties for practical use is not attained until after several days.

The use of conventional urethanation catalyst for raising reactivity causes premature increase of the liquid viscosity, leading to curing without sufficient penetration of the polyurethane composition into the long-fiber mat. On the other hand, adjustment of the reactivity to allow the polyurethane composition to penetrate into the long fiber mat involves problems that the property development upon curing is poor, and long time is required before the mold removal, thus resulting in low productivity.

SUMMARY OF THE INVENTION

It is an object of the present invention to provide a fiber-reinforced polyurethane composition which is capable of penetrating sufficiently into a long fiber mat, and developing the properties thereof even at low temperature curing, and the cured produces of which have satisfactory impact resistance, heat-resistance, and strength.

The present invention provides a fiber-reinforced polyurethane composition comprising a long-fiber mat and a polyurethane composition, said polyurethane composition comprising: (a) an organic polyisocyanate, (b) a polyether polyol having a molecular weight of from 300 to 700, and having three or more functional groups, (c) ethylene glycol and/or 1,3-butanediol, d) an imidazole represented by the general formula (1), as a curing catalyst,

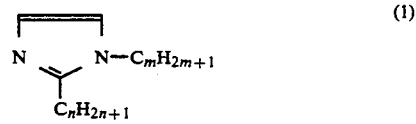

where m is an integer of from 1 to 4, and n is an integer of from 1 to 4; the ratio of a) to the sum of (a)+(b) being from 130/100 to 180/100 by weight, and the ratio of the polyurethane composition to the long-fiber mat is from 90/10 to 50/50 by weight.

DETAILED DESCRIPTION OF THE PREFERRED EMBODIMENT

In the present specification and claims, the term of "a composition for fiber reinforced polyurethane resin" means a composition comprising a polyurethane composition and long-fiber mat, said polyurethane composition comprising polyisocyanates, polyether polyols, diols, and a catalyst. Said polyurethane composition penetrates well into the long-fiber mat. Said composition for fiber reinforced polyurethane resins cures quickly to produce polyurethane resins excellent in impact resistance, heat-resistance, and rigidity.

The inventors of the present invention, after comprehensive investigation, found that a combination of a specific polyurethane composition containing polyisocyanates, polyols and diols, a specific catalyst, and a long-fiber mat has a satisfactory quick-curing property at a low temperature and gives satisfactory property of the molded products, and thus have completed the present invention.

The composition of the present invention is molded by introducing a polyurethane composition into a closed mold containing a long fiber mat, preliminarily set therein, or by introducing a polyurethane composition into a mold before closing the mold depending on the mold structure. The introduction of the composition is practiced in a simple manner by means of a high pressure reaction injection molding machine (RIM), or a low pressure two-liquid mixing injector.

The examples of organic polyisocyanate (a) useful in the present invention include aliphatic polyisocyanates such as hexamethylene 1,6-diisocyanate, 2,2,4- or 2,4,4-trimethylhexamethylene-1,6-diisocyanate, etc.; alicyclic polyisocyanates such as cyclohexane-1,4-diisocyanate, dicyclohexylmethane-4,4'-diisocyante, etc.; aromatic polyisocyanates such as p-phenylene diisocyanate, tolylene-2,4- or -2,6-diisocyanate, diphenylmethane-2,4'- or -4,4'-diisocyanate, naphthylene-1,5-diisocyanate, xylylene-1,3-or -1,4-diisocyanate, diphenyl ether-4,4'-diisocyanate, etc.

Also useful are a polyphenylene-polymethylene-polyisocyanate such as those prepared from condensation of aniline with formaldehyde and subsequent phosgenation; diphenylmethane diisocyanates which have a carbodiimide group or a uretonimine group and are liquid at a normal temperature; and modified polyisocyanates having a urethane linkage, an allophanate linkage, a biuret linkage, or a uretidione ring, and the like.

Isocyanate-based prepolymers may also be used which are prepared by reacting excessive amount of the above mentioned polyisocyanate with a polyol.

Particularly preferably organic isocyanates among them are diphenylmethane diisocyanate type polyisocyanates such as polyphenylene-polymethylenepolyisocyanates which are liquid and of low viscosity at a normal temperature and give molded products of high rigidity; and diphenylmethane diisocyanates having a carbodiimide group or a uretonimine group.

The polyether polyol (b) which may be used in the present invention includes those having a molecular weight of from 300 to 700 and having three or more functional groups, which are prepared by adding ethylene oxide, propylene oxide, etc. to a polyol such as glycerin, trimethylolpropane, pentaerythritol, etc., an aminoalcohol such as diethanolamine, triethanolamine, tripropanolamine, etc., an amine such as ethylenediamine, 1,6-hexanediamine, diethylenetriamine, tolylenediamine, etc., or a mixture thereof.

A polyether polyol having a molecular weight of lower than 300 reacts too rapidly to catalytically control the reaction, resulting in a lower impact strength of the cured product. On the contrary, a polyether polyol having a molecular weight exceeding 700 gives neither rigidity nor heat-resistance necessary or a structural material. Moreover, even within a range of the molecular weight of from 300 to 700, a polyether polyol having two functional group also gives neither practicably sufficient rigidity nor heat-resistance The chain extender (c) useful in the present invention includes ethylene glycol, 1,3-butanediol, and a mixture thereof. For chain extenders in polyurethane composition, other compounds are generally well-known such as 1,4-butanediol, 1,6-hexanediol, dipropylene glycol, diethylene glycol, and the like. Among them, however, 1,4-butanediol and 1,6-hexanediol are not desirable because they are solid at a room temperature in winter, and need a melting step in formulating it into a polyether polyol, and further the formulated liquid may cause phase separation in winter. A chain extender having relatively high molecular weight such as dipropylene glycol, diethylene glycol, and 1,6-hexanediol is also not desirable because it gives lower cohesive strength between hard segments in polyurethane, resulting in insufficient rigidity and insufficient heat-resistance.

The ratio of the organic polyisocyanate to the polyol (the sum of the polyether polyol and the chain extender) is in the range of from 130/100 to 180/100 by weight. A less amount of the organic polyisocyanate tends to give lower heat resistance, while a larger amount of the polyisocyanate tends to give lower impact strength.

The ratio of the polyether polyol (b) to the chain extender agent (c) to be used in the present invention is preferably within the range of from 100/4 to 100/100, particularly preferably from 100/5 to 100/60 by weight.

The curing catalyst (d) to be used in the present invention includes the imidazole compounds represented by the general formula (1):

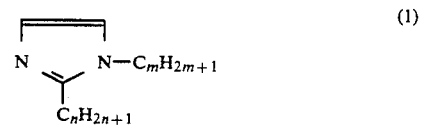

where m is an integer of from 1 to 4, and n is an integer of from 1 to 4.

The typical examples are 1,2-dimethylimidazole, 1-butyl-2-methyl-imidazole, etc.

A known urethanation catalyst may also be combinedly used in the present invention. The typical examples are tertiary amines such as triethylamine, tripropylamine, tributylamine, N-methylmorpholine, N,N-dimethylcyclohexylamine, N,N-dimethylbenzylamine, N,N,N',N'-tetramethylhexamethylenediamine, triethylenediamine, 1,8-diazabicyclo[5.4.0]undecene-7; organic acid salts thereof: and orgnic metal compounds such as stannous octoate, dibutylyin dilaurate, zinc naphthenate, etc.

The long-fiber mat useful in the present invention includes glass fiber, carbon fiber, aramid fiber, etc. in a form of a chopped strand mat, a continuous strand mat, a surfacing mat, cloth, roving cloth, or the like. Two or more kind of such long-fiber mat may be combinedly used.

The term aramid fiber, as used herein, means an aromatic polyamide fiber which contains, in the polyamide structure, amide linkages between aromatic rings. Such materials have been commercialized by E. I. du Pont de Nemours & Co., Inc., under the trademarks "Nomex" and "Kevlar". A discussion of various aspects of aramid fibers, including their preparation and properties, appears in the *Encyclopedia of Chemical Technology* (John Wiley & Sons, Inc. 1978), Vol. 3, pp. 213–242.

The ratio of the polyurethane composition to the long-fiber mat in the present invention is preferably in the range of from 90/10 to 50/50 by weight. A smaller ratio of the long-fiber mat is undesirable because it causes insufficient rigidity, while a larger ratio thereof is also undesirable because it makes difficult the impregnation of the polyurethane composition into the long-fiber mat.

In the present invention, various types of wire cloth, and reticulate molded resin articles may also be used in combination with the long-fiber mat, if necessary. Further, a foaming agent, a flame retardant, a coloring agent, a filler, an internal release agent, or other processing auxiliary may be used in the present invention.

The fiber-reinforced polyurethane composition of the present invention is quick curing, and the cured articles are excellent in impact resistance, heat resistance, and rigidity, therefore is considerably useful for bumper beams, floor panels, door inner panels, door liners, head liners, instrument boards, pillar covers, etc. in automobile industry, and for structural material of industrial parts.

The present invention is described below in more detail referring to examples without limiting it in any way.

EXAMPLES

The physical properties were measured according to the methods shown below.

| Item | Method |
|---|---|
| Specific gravity | JIS K-7112 |
| Flexural modulus | JIS K-7203 |
| Flexural strength | JIS K-7203 |
| Izod impact strength (notched) | JIS K-7110 |
| Heat distortion temperature (load: 18.5 kgf/cm$^2$) | JIS K-7207 |

EXAMPLES 1-3, AND COMPARATIVE EXAMPLES 1-2

In a mold having a cavity size of 300×300×3 mm kept at 50° C., Glasron M8609 (trade name, glass continuous mat, made by Asahi Fiberglass K.K.) of the same size was placed. 150 parts by weight of Millionate MR200 (trade name, polyphenylene-polymethylene-polyisocyanate, NCO content: 30.9%, made by Nippon Polyurethane Industry Co., Ltd.), 93.9 parts by weight of Adeka polyether AM30 (trade name. glycerin-based polyether-polyol, hydroxyl number:540, made by Asahi Denka Kogyo K.K.), 6.1 parts by weight of ethylene glycol, and a curing catalyst shown in Table 1 were blended at 25° C. by stirring with a Labomixer. The mixture was poured into the mold, and immediately the mold was closed. Two minutes after the mold closure, the mold was removed, and the tack of the surface of the molded plate was observed. In each of the formulations, the amount of the catalyst was adjusted to give a gel time of from 20 to 30 seconds.

The results are shown in Table 1.

TABLE 1

|  | Example | | | Comparative example | |
|---|---|---|---|---|---|
|  | 1 | 2 | 3 | 1 | 2 |
| 1,2-dimethyl-imidazole | 0.3 | 0.2 | 0.25 | — | — |

TABLE 1-continued

|  | Example | | | Comparative example | |
|---|---|---|---|---|---|
|  | 1 | 2 | 3 | 1 | 2 |
| DABCO 33LV[1] | — | 0.1 | — | 0.25 | — |
| N,N-dimethylcyclohexylamine | — | — | 0.1 | — | 0.5 |
| Tack of molded plate | no | no | no | tack | tack |

Remark:
[1]Trade name, a solution of triethylenediamine in dipropylene glycol, made by Sanyo Air Products Co.;

The amount of the catalyst is shown in % by weight based on the polyurethane resin composition.

EXAMPLE 4-6, AND COMPARATIVE EXAMPLES 3-4

Glasron M8609 was placed in a mold same as that of Example 1 kept at 50° C. Thereto, two components, A and B shown in Table 2 were injected by means of a low-pressure two-liquid mixing injector (Model MU203H, made by Polyurethane Engineering K.K.). Three minutes after the mold closure, the mold was removed to give a molded plate. The formulations of the materials, and the properties of the resulting plates are shown in Table 2.

TABLE 2

|  |  |  | Example 4 | Example 5 | Example 6 | Comparative example 3 | Comparative example 4 |
|---|---|---|---|---|---|---|---|
| Formulation (parts by weight) | Component A | Millionate MR200 | 170 | — | 180 | 170 | 170 |
|  |  | Millionate MTL 1) | — | 150 | — | — | — |
|  | Component B | Sannix GP400 2) | — | 79.2 | 75.8 | — | — |
|  |  | Adeka Polyether AM30 | 89.9 | — | — | 56.8 | — |
|  |  | Adeka Polyether P400 3) | — | — | — | — | 74.1 |
|  |  | Ethylene glycol | 10.1 | — | 12.1 | — | 25.9 |
|  |  | 1,3-butanediol | — | 20.8 | 12.1 | — | — |
|  |  | Dipropylene glycol | — | — | — | 43.2 | — |
|  |  | 1-butyl-2-methyl imidazole | 0.3 | 0.4 | 0.5 | 0.3 | 0.4 |
|  |  | DABCO 33LV | 0.1 | 0.2 | — | 0.1 | 0.1 |
| M8609 | (% by weight) |  | 16 | 17 | 16 | 16 | 16 |
| A/B | (weight ratio) |  | 170/100 | 150/100 | 180/100 | 170/100 | 170/100 |
| NCO/OH | (equivalent ratio) |  | 1.05 | 1.00 | 1.10 | 1.05 | 1.05 |
| Property | Specific gravity |  | 1.23 | 1.25 | 1.27 | 1.24 | 1.22 |
|  | Flexural modulus kgf/cm$^2$ |  | 40,700 | 37,900 | 41,300 | 38,900 | 24,000 |
|  | Flexural strength kgf/cm$^2$ |  | 1,210 | 1,170 | 1,320 | 1,150 | 820 |
|  | Izod impact strength kgfcm/cm |  | 22 | 20 | 23 | 19 | 20 |
|  | Heat distortion temperature °C. |  | 108 | 100 | 104 | 72 | 68 |

Remark:
1) Liquid diphenylmethane diisocyanate, containing carbodiimide group
2) Polyoxypropylenetriol, Trade name, made by Sanyo Chemical Industries, Co., Ltd.; hydroxyl number: 402
3) Polyoxypropylenetriol Trade name, made by Asahi Denka Kogyo K.K.; hydroxyl number: 270

EXAMPLE 7, AND COMPARATIVE EXAMPLES 6-7

Glasron M8609 was placed in a mold having a cavity size of 300×250×2.5 mm kept at 50° C. After the mold had been closed, two components, A and B at a temperature of 30° C. shown in Table 3 were injected into the mold by means of a high-pressure reaction injection machine RIM) Model MC102, made by Polyurethane Engineering K.K.). Three minutes later, the mold was removed to give a molded plate. The formulations of the materials and the properties of the resulting plates are shown in Table 3.

TABLE 3

|  |  |  | Example 7 | Comparative example 6 | Comparative example 7 |
|---|---|---|---|---|---|
| Formulation (parts by | Component A | Millionate MR200 | 170 | 200 | 120 |
|  | Component B | Sannix GP400 | 68.4 | 54.4 | 91.7 |
|  |  | 1,3-butanediol | 31.6 | 45.6 | 8.3 |

TABLE 3-continued

|   |   | Example 7 | Comparative example 6 | Comparative example 7 |
| --- | --- | --- | --- | --- |
| weight) | 1,2-dimethy-imidazole | 0.3 | 0.3 | 0.3 |
|   | U-CAT SA102 1) | 0.2 | 0.2 | 0.2 |
| M8609 | (% by weight) | 24 | 25 | 24 |
| A/B | (weight ratio) | 170/100 | 200/100 | 120/100 |
| NCO/OH | (equivalent ratio) | 1.05 | 1.05 | 1.05 |
| Prop- | Specific gravity | 1.37 | 1.39 | 1.30 |
| erty | Flexural modulus kgf/cm$^2$ | 57,300 | 58,300 | 45,600 |
|   | Flexural strength kgf/cm$^2$ | 1,730 | 1,880 | 1,420 |
|   | Izod impact strength kgfcm/cm | 35 | 24 | 38 |
|   | Heat distortion temperature °C. | 224 | 229 | 153 |

Remark:
1) Octylic acid salt of 1,8-diazabicyclo[5.4.0]undecene-7 Trade name, made by San-apuro K.K.

What is claimed is:

1. A composition for fiber-reinforced polyurethane resin, which comprises a long-fiber mat and a polyurethane composition, said polyurethane composition being curable in a mold in a period of from 1 to 3 minutes at a temperature in the range of 40° C. to 60° C., said polyurethane composition comprising:
   (a) an organic polyisocyanate,
   (b) a polyether polyol having a molecular weight of from 300 to 700, and having three or more functional groups,
   (c) a chain extender selected from the group consisting of ethylene glycol and 1,3-butanediol,
   (d) an imidazole represented by the general formula (1), as a curing catalyst,

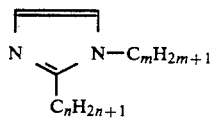

where m is an integer of from 1 to 4, and n is an integer of 1 to 4.

2. The composition of claim 1 wherein the organic polyisocyanate is selected from the group consisting of aliphatic polyisocyanates, alicyclic polyisocyanates and aromatic polyisocyanates.

3. The composition of claim 1 in which the organic polyisocyanate is a polyphenylene-polymethylene-polyisocyanate prepared from the condensation of aniline with formaldehyde and subsequent phosgenation.

4. The composition of claim 1 in which the organic polyisocyanate is a diphenylmethane diisocyanate.

5. The composition of claim 4 wherein the diphenylmethane diisocyanate is a liquid at 25° C. and has a carbodiimide or uretonimine group.

6. The composition of claim 1 in which the organic polyisocyanate is selected from the group consisting of those with an urethane linkage, an allophanate linkage, a biuret linkage, and a uretidione ring.

7. The composition of claim 3 wherein the polyphenylene-polymethylene-polyisocyanate is liquid at a temperature of 25° C., and give rigid molded products.

8. The composition of claim 1 wherein the polyether polyol is prepared by adding an oxide selected from the group consisting of ethylene oxide or propylene oxide to a compound selected from the group consisting of glycerin, trimethylolpropane, pentaerythritol, diethanolamine, triethanolamine, tripropanolamine, 1,6-hexanediamine, diethylenetriamine, and tolylenediamine.

9. The composition of claim 1 wherein the curing catalyst is selected from a group consisting of 1,2-dimethylimidazole and 1-butyl-2-methyl-imidazole.

10. The composition of claim 1 further comprising a catalyst selected from the group consisting of tertiary amines, organic acid salts of tertiary amines, and organic metal compounds.

11. The composition of claim 1 wherein the long-fiber mat is selected from the group consisting of a glass fiber mat, a carbon fiber mat, and an aramide fiber mat.

12. The composition of claim 1 wherein the form of the long-fiber mat is selected from the group consisting of a chopped strand mat, a continuous strand mat, and a surfacing mat, cloth, or roving cloth.

13. The composition of claim 1 wherein the long-fiber mat is combined with materials selected from the group consisting of wire cloth and reticulate molded resin.

14. The composition of claim 1 combined with a material selected from the group consisting of a foaming agent, a flame retardant, a coloring agent, a filler, and an internal release agent.

15. The composition of claim 1 wherein the ratio of the organic polyisocyanate to the polyol of the polyether polyol and the chain extender is in the range of from 130/100 to 180/100 by weight, the ratio of the polyether polyol to the chain extender agent is within the range of from 100/4 to 100/100 by weight, and the ratio of the polyurethane composition to the long-fiber mat is in the range of 90/10 to 50/50 by weight.

16. The composition of claim 15 wherein the ratio of the polyether polyol to the chain extender agent is within the range of from 100/5 to 100/60.

17. A process for molding a polyurethane composition, said polyurethane composition being curable in a mold in a period from 1 to 3 minutes at a temperature in the range of 40° C. to 60° C., which composition contains
   (a) an organic polyisocyanate,
   (b) a polyether polyol having a molecular weight of from 300 to 700, and having three or more functional groups,
   (c) a chain extender comprised of ethylene glycol and 1,3-butanediol,
   (d) an imidazole represented by the general formula, (1), as a curing catalyst,

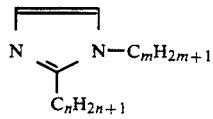

where m is an integer of from 1 to 4, and n is an integer of from 1 to 4, which process comprises introducing the composition into a mold containing a long-fiber mat preliminarily set therein.

18. A process as recited in claim 17, wherein the introduction is done by means of high-pressure reaction injection molding.

19. A process as recited in claim 17, wherein the introduction is done by means of low-pressure two-liquid injection mixing.

20. A process for molding the polyurethane composition of claim 1, wherein the composition is introduced into the mold before closing the mold.

21. The product of the process of claim 17.

22. A reaction mixture, said reaction mixture being curable in a mold in a period from 1 to 3 minutes at a temperature in the range of 40° C. to 60° C., comprising:
(a) a prepolymer formed from an organic polyisocyanate and a polyether polyol having a molecular weight of from 300 to 700, and having three or more functional groups,
(b) a chain extender selected from the group consisting of ethylene glycol and 1,3-butanediol,
(c) an imidazole represented by the general formula, (1), as a curing catalyst,

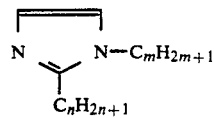

where m is an integer of from 1 to 4, and n is an integer of from 1 to 4, and
(d) a long fiber mat.

23. A process for molding a polyurethane composition, said polyurethane composition being curable in a mold in a period from 1 to 3 minutes at a temperature in the range of 40° C. to 60° C., which composition contains
(a) a prepolymer formed from a organic polyisocyanate and a polyether polyol having a molecular weight of from 300 to 700, and having three or more functional groups,
(b) a chain extender selected from the group consisting of ethylene glycol and 1,3-butanediol,
(c) an imidazole represented by the general formula, (1), as a curing catalyst,

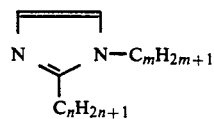

where m is an integer of from 1 to 4, and n is an integer of from 1 to 4, which process comprises introducing the composition into a mold containing a long-fiber mat preliminarily set therein.

24. The product of the process of claim 23.

* * * * *